United States Patent [19]

Nakanishi et al.

[11] Patent Number: 4,466,396

[45] Date of Patent: Aug. 21, 1984

[54] FLOW CONTROL DEVICE OF A HELICALLY-SHAPED INTAKE PORT

[75] Inventors: Kiyoshi Nakanishi, Susono; Ituo Koga, Okazaki, both of Japan

[73] Assignee: Toyota Jidosha Kogyo Kabushiki Kaisha, Aichi, Japan

[21] Appl. No.: 391,390

[22] Filed: Jun. 23, 1982

[30] Foreign Application Priority Data

Jun. 29, 1981 [JP] Japan .................. 56-99736

[51] Int. Cl.³ ............... F02B 31/00; F02M 35/10
[52] U.S. Cl. ................. 123/188 M; 123/306
[58] Field of Search ........... 123/188 M, 306, 308, 123/52 M, 432

[56] References Cited

U.S. PATENT DOCUMENTS

| | | | |
|---|---|---|---|
| 3,850,479 | 11/1979 | Boyhont et al. | 302/29 |
| 4,174,686 | 11/1979 | Shimizu et al. | 123/188 M |
| 4,196,701 | 4/1980 | Tamura et al. | 123/188 M |
| 4,201,165 | 5/1980 | Tanaka et al. | 123/568 |
| 4,253,432 | 3/1981 | Nohira et al. | 123/52 M |
| 4,256,062 | 3/1981 | Schafer | 123/52 M |
| 4,257,384 | 3/1981 | Matsumoto | 123/575 |
| 4,312,309 | 1/1982 | Nakanishi et al. | 123/188 M |
| 4,347,816 | 9/1982 | Saito et al. | 123/308 |

FOREIGN PATENT DOCUMENTS

| | | |
|---|---|---|
| 2059008 | 6/1972 | Fed. Rep. of Germany . |
| 143289 | 8/1980 | German Democratic Rep. ............. 123/188 M |
| 52-127113 | 9/1977 | Japan . |
| 58129 | 5/1979 | Japan . |
| 19945 | 2/1980 | Japan ............. 123/308 |
| 54922 | 5/1981 | Japan . |
| 68519 | 4/1982 | Japan . |

Primary Examiner—Craig R. Feinberg
Assistant Examiner—W. R. Wolfe
Attorney, Agent, or Firm—Parkhurst & Oliff

[57] ABSTRACT

A helically-shaped intake port comprising a helical portion formed around an intake valve and a substantially straight inlet passage portion tangentially connected to the helical portion. A bypass passage is branched off from the inlet passage portion and connected to the helical portion. A flow control valve is arranged in the bypass passage and actuated by a bellows. The flow control valve is opened when the amount of air fed into the cylinder of an engine is increased beyond a predetermined value.

19 Claims, 10 Drawing Figures

FLOW CONTROL DEVICE OF A HELICALLY-SHAPED INTAKE PORT

BACKGROUND OF THE INVENTION

The present invention relates to a flow control device of a helically-shaped intake port of an internal combustion engine.

A helically-shaped intake port normally comprises a helical portion formed around the intake valve of an engine and a substantially straight inlet passage portion tangentially connected to the helical portion. However, if such a helically-shaped intake port is so formed that a strong swirl motion is created in the combustion chamber of an engine when the engine is operating at a low speed under a light load, that is, when the amount of air fed into the cylinder of the engine is small, since air flowing within the helically-shaped intake port is subjected to a great flow resistance, a problem occurs in that the volumetric efficiency is reduced when the engine is operating at a high speed under a heavy load, that is, when the amount of air fed into the cylinder of the engine is large.

In order to eliminate such a problem, the inventor has proposed a flow control device in which a bypass passage, branched off from the inlet passage portion and connected to the helix terminating portion of the helical portion, is formed in the cylinder head of an engine. A normally closed type flow control valve, actuated by an actuator, is arranged in the bypass passage and opened under the operation of the actuator when the amount of air fed into the cylinder of the engine is larger than a predetermined amount.

In this flow control device, when the amount of air fed into the cylinder of the engine is large, that is, when the engine is operating under a heavy load at a high speed, a part of the air introduced into the inlet passage portion is fed into the helical portion of the helically-shaped intake port via the bypass passage. This reduces the flow resistance of the helically-shaped intake port and, thus, enables high volumetric efficiency.

This flow control device, however, is just the embodiment of the basic principle of operation. In order to commercialize such a flow control device, various problems remain to be solved, for example, how to reduce manufacturing time and manufacturing cost, how to easily manufacture the flow control device, and how to obtain reliable flow control device operation.

SUMMARY OF THE INVENTION

An object of the present invention is to provide a flow control device with a helically-shaped intake port, which has a construction suited for commercializing the basic principle of operation proposed by the inventor.

According to the present invention, there is provided a device for controlling the flow in a helically-shaped intake port of an internal combustion engine, said intake port comprising a helical portion formed around an intake valve, and a substantially straight inlet passage portion tangentially connected to the helical portion and having a helix terminating portion, said device comprising: a bypass passage branched off from the inlet passage portion and connected to the helix terminating portion of the helical portion; a normally closed flow control valve transversely movable in said bypass passage for controlling the flow area of said bypass passage, said flow control valve having a bellows therein and being actuated by said bellows; and actuating means for actuating said bellows in response to the change in the amount of air fed into the intake port to open said flow control valve when said amount of air is increased beyond a predetermined value.

The present invention may be more fully understood from the description of preferred embodiments of the invention set forth below, together with the accompanying drawings.

DESCRIPTION OF PREFERRED EMBODIMENTS

Figure 1:
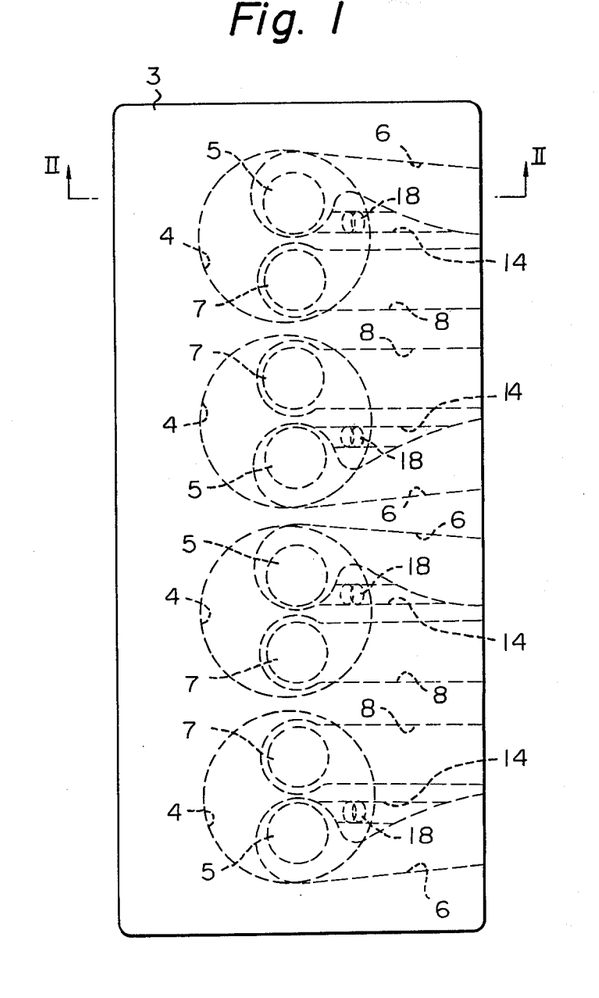
FIG. 1 is a plan view of an internal combustion engine according to the present invention.
Figure 2:
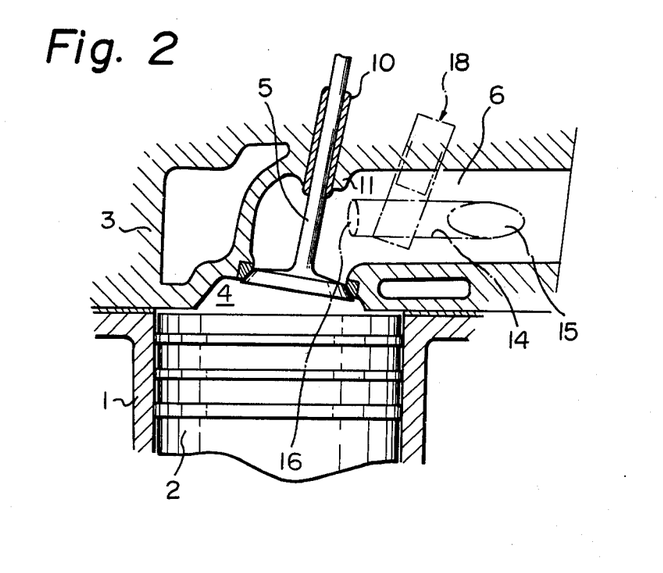
FIG. 2 is a cross-sectional view taken along the line II—II in FIG. 1.

Referring to FIGS. 1 and 2, reference numeral 1 designates a cylinder block, 2 a piston reciprocally movable in the cylinder block 1, 3 a cylinder head fixed onto the cylinder block 1, and 4 a combustion chamber formed between the piston 2 and the cylinder head 3; 5 designates an intake valve, 6 a helically-shaped intake port formed in the cylinder head, 7 an exhaust valve, and 8 an exhaust port formed in the cylinder head 3. A spark plug (not shown) is arranged in the combustion chamber 4.

Figure 3:
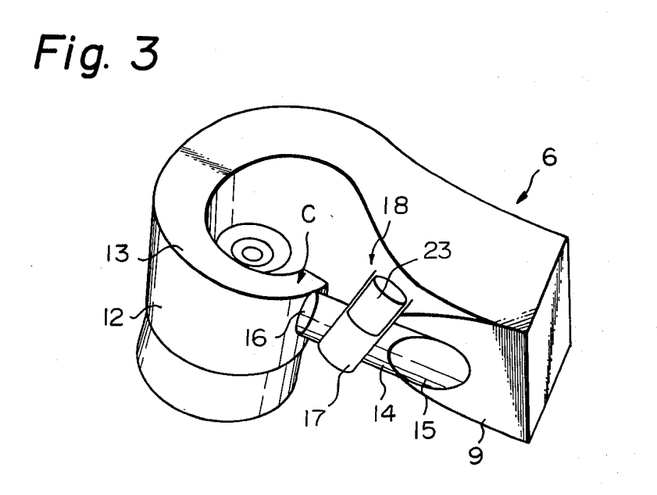
FIG. 3 is a perspective view schematically illustrating the shape of a helically shaped-intake port.
Figure 4:
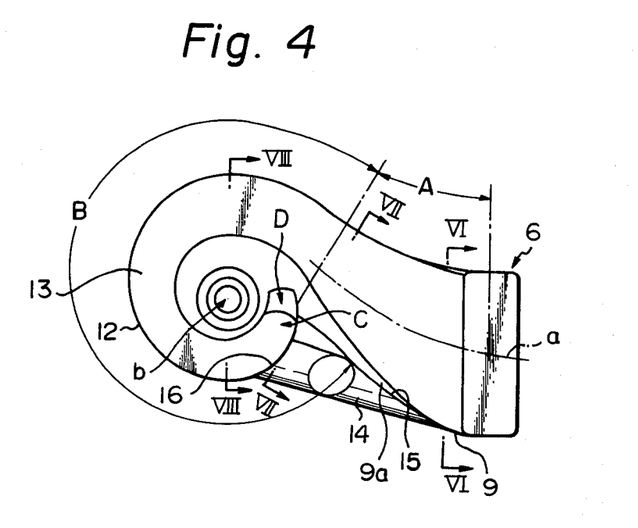
FIG. 4 is a plan view of FIG. 3.
Figure 5:
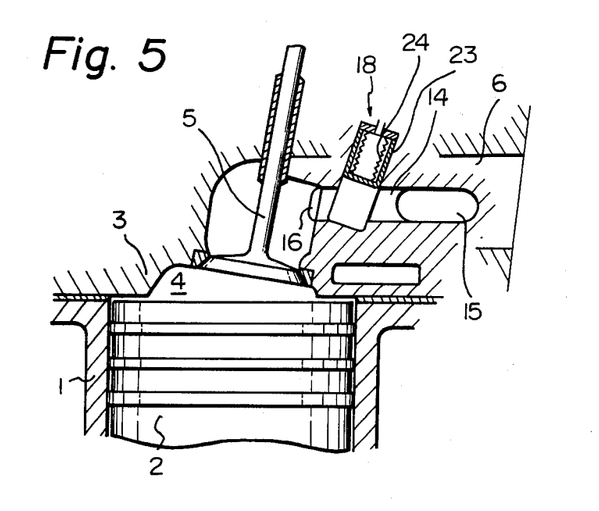
FIG. 5 is a cross-sectional view taken along the bypass passage in FIG. 3.
Figure 6:
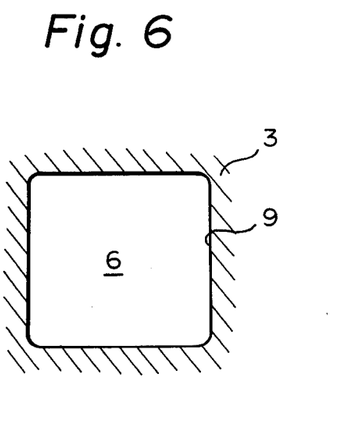
FIG. 6 is a cross-sectional view taken along the line VI—VI in FIG. 4.
Figure 7:
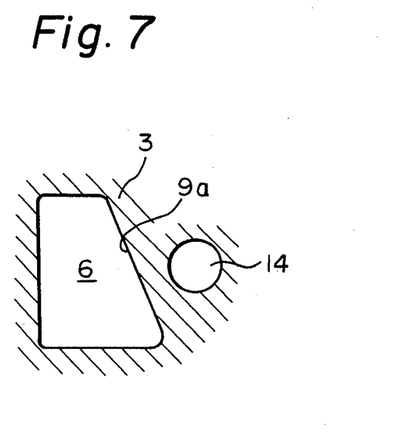
FIG. 7 is a cross-sectional view taken along the line VII—VII in FIG. 4.
Figure 8:
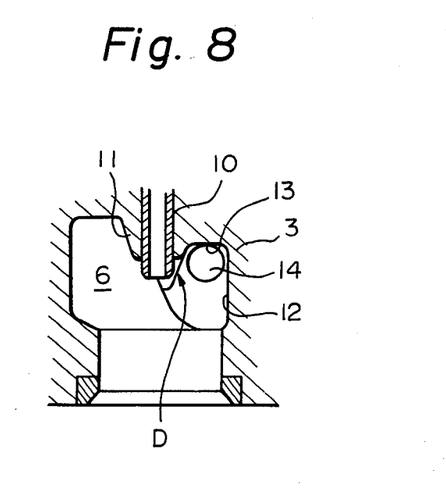
FIG. 8 is a cross-sectional view taken along the line VIII—VIII in FIG. 4.

FIGS. 3 through 5 schematically illustrate the shape of the helically-shaped intake port 6 illustrated in FIG. 2. As illustrated in FIG. 4, the helically-shaped intake port 6 comprises an inlet passage portion A the longitudinal central axis of which is slightly curved, and a helical portion B formed around the valve stem of the intake valve 5. The inlet passage portion A is tangentially connected to the helical portion B. As illustrated in FIGS. 3, 4, and 7, the side wall 9 of the inlet passage portion A, which is located near the helical portion b, has on its upper portion an inclined wall portion 9a which is arranged to be directed downwards. The width of the inclined wall portion 9a is gradually increased toward the helical portion B and, as is illustrated in FIG. 7, the entire portion of the side wall 9 is inclined at the connecting portion of the inlet passage portion A and the helical portion B. The upper half of the side wall 9 is smoothly connected to the circumferential wall of a cylindrical projection 11 (FIG. 2) which is formed on the upper wall of the intake port 6 at a position located around a valve guide 10 of the intake valve 5. The lower half of the side wall 9 is connected to the side wall 12 of the helical portion B at the helix terminating portion C of the helical portion B. In addition, the upper wall 13 of the helical portion B is connected to a steeply inclined wall D at the helix terminating portion C of the helical portion B.

As illustrated in FIGS. 1 through 5, bypass passages 14, branched off from the inlet passage portions A of the corresponding intake ports 6 and having a substantially uniform cross-section, are formed in the cylinder head 3. Each of the bypass passages 14 is connected to the helix terminating portion C of the corresponding intake port 6. Each of the inlet openings 15 of the bypass passages 14 is formed on the side wall 9 at a position located near the inlet open end of the inlet passage portion A of the corresponding intake port 6. Each of the outlet openings 16 of the bypass passages 14 is formed on the upper end portion of the side wall 12 at the helix terminating portion C of the corresponding intake port 6.

In addition, valve insertion bores 17, extending across the corresponding bypass passages 14, are formed in the cylinder head 3. Flow control valves 18 are inserted into the corresponding valve insertion bores 17.

Figure 9:
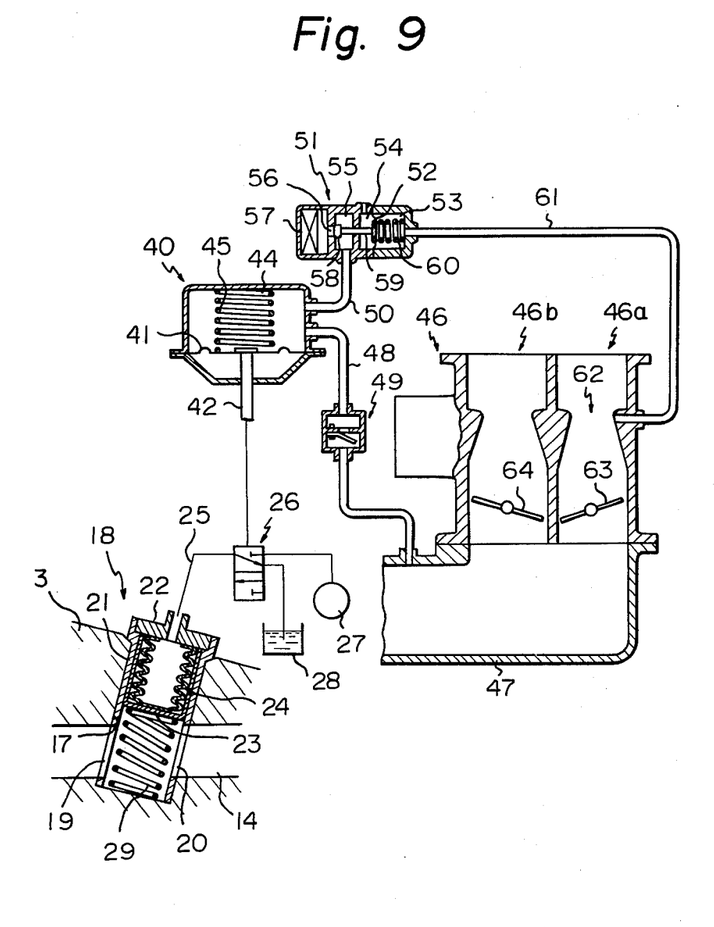
FIG. 9 is an entire view of an embodiment of a flow control device.

As illustrated in FIG. 9, a hollow sleeve 21, having a pair of openings 19, 20 which are aligned with the bypass passage 14, is fitted into the valve insertion bore 17. The top of the hollow sleeve 21 is closed by a lid 22. A cup-shaped piston 23 is slidably inserted into the hollow sleeve 21. A bellows 24 is arranged in the piston 23. The upper end of the bellows 24 is tightly fixed onto the lower wall of the lid 22. The lower end of the bellows 24 abuts against the piston 23. The interior of the bellows 24 is selectively connected to a lubricating oil feed pump 27 driven by the engine or a lubricating oil reservoir 28 via a conduit 25 and a directional control valve 26. In addition, a compression spring 29 for biasing the piston 23 upward is arranged in the hollow sleeve 21.

As illustrated in FIG. 9, the directional control valve 26 is connected to a control rod 42 which is fixed onto a diaphragm 41 of a vacuum operated diaphragm apparatus 40 so that the directional control valve 26 is controlled by the diaphragm apparatus 40. The diaphragm apparatus 40 comprises a vacuum chamber 44 separated from the atmosphere by the diaphragm 41, and a compression spring 45 for biasing the diaphragm 41 is inserted into the vacuum chamber 44.

An intake manifold 47, equipped with a compound type carburetor 46 comprising a primary carburetor A and a secondary carburetor B, is mounted on the cylinder head 3, and the vacuum chamber 44 is connected to the interior of the intake manifold 47 via a vacuum conduit 48. A check valve 49, permitting air to flow from the vacuum chamber 44 into the intake manifold 47, is arranged in the vacuum conduit 48. In addition, the vacuum chamber 44 is connected to the atmosphere via an atmosphere conduit 50 and a control valve 51. This control valve 51 comprises a vacuum chamber 53 and an atmospheric pressure chamber 54 which are separated by a diaphragm 52 and, in addition, the control valve 51 further comprises a valve chamber 55 arranged adjacent to the atmospheric pressure chamber 54. The valve chamber 55 is connected, on one hand, to the vacuum chamber 44 via the atmosphere conduit 50 and, on the other hand, to the atmosphere via a valve port 56 and an air filter 57. A valve body 58, controlling the opening operation of the valve port 56, is arranged in the valve chamber 55 and connected to the diaphragm 52 via a valve rod 59. A compression spring 60 for biasing the diaphragm 52 is inserted into the vacuum chamber 53. The vacuum chamber 53 is connected to a venturi portion 62 of the primary carburetor A via a vacuum conduit 61.

The carburetor 46 is a conventional carburetor. Consequently, when the opening degree of a primary throttle valve 63 is increased beyond a predetermined degree, a secondary throttle valve 64 is opened. When the primary throttle valve 63 is fully opened, the secondary throttle valve 64 is also fully opened. The level of vacuum produced in the venturi portion 62 of the primary carburetor A is increased as the amount of air fed into the cylinder of the engine is increased. Consequently, when a great vacuum is produced in the venturi portion 62, that is, when the engine is operating at a high speed under a heavy load, the diaphragm 52 of the control valve 51 moves toward the right in FIG. 13 against the compression spring 60. As a result of this, the valve body 58 opens the valve port 56 and, thus, the vacuum chamber 44 of the diaphragm apparatus 40 becomes open to the atmosphere. At this time, the diaphragm 41 moves downward in FIG. 13 due to the spring force of the compression spring 45 and, thus, the interior of the bellows 24 is connected to the lubricating oil reservoir 28 via the directional control valve 26 as illustrated in FIG. 9. As a result of this, since the piston 23 moves upward to the uppermost position due to the spring force of the compression spring 29, the piston 23 opens the bypass passage 14.

On the other hand, in the case wherein the opening degree of the primary throttle valve 53 is small, since the vacuum produced in the venturi portion 62 is small, the diaphragm 52 of the control valve 51 moves toward the left in FIG. 13 due to the spring force of the compression spring 60 and, as a result, the valve body 58 closes the valve port 56. In addition, in the case wherein the opening degree of the primary throttle valve 63 is small, a great vacuum is produced in the intake manifold 47. Since the check valve 49 opens when the level of vacuum produced in the intake manifold 47 becomes greater than that of the vacuum produced in the vacuum chamber 44, and since the check valve 49 closes when the level of the vacuum produced in the intake manifold 47 becomes smaller than that of the vacuum produced in the vacuum chamber 44, the level of the vacuum in the vacuum chamber 44 is maintained at the maximum vacuum which has been produced in the intake manifold 47 as long as the control valve 51 remains closed. If a vacuum is produced in the vacuum chamber 44, the diaphragm 41 moves upward in FIG. 13 against the compression spring 45 and, as result, the directional control valve 26 is actuated so that the interior of the bellows 24 is connected to the lubricating oil pump 27. At this time, since the lubricating oil pressure acts on the interior of the bellows 24, the bellows 24 expands. As a result of this, since the piston 23 moves downward against the compression spring 29, the piston 23 completely shuts off the bypass passage 14. In the case wherein the engine speed is low even if the engine is operating under a heavy load and in the case wherein the engine is operating under a light load even if the engine speed is high, since the vacuum produced in the venturi portion 62 is small, the control valve 51 remains closed. Consequently, when the engine is operating at a low speed under a heavy load and at a high speed under a light load, since the level of the vacuum in the vacuum chamber 44 is maintained at the above-mentioned maximum vacuum, the bypass passage 14 is closed by the flow control valve 18.

As mentioned above, when the engine is operating at a low speed under a light load, that is, when the amount of air fed into the cylinder of the engine is small, the flow control valve 18 closes the bypass passage 14. At this time, the mixture introduced into the inlet passage portion A moves downward, while swirling, along the upper wall 13 of the helical portion B. Then, since the mixture, while swirling, flows into the combustion chamber 4, a strong swirling motion is created in the combustion chamber 4.

When the engine is operating at a high speed under a heavy load, that is, when the amount of air fed into the cylinder of the engine is large, since the flow control valve 18 opens the bypass passage 14, a part of the mixture introduced into the inlet portion A is fed into the helical portion B via the bypass passage 14 having a low flow resistance. Since the flow direction of the mixture stream flowing along the upper wall 13 of the helical portion B is deflected downward by the steeply inclined wall D of the helix terminating portion C, a great vacuum is produced at the helix terminating portion C, that is, in the outlet opening 16 of the bypass passage 14. Consequently, since the pressure difference between the vacuum in the inlet passage portion A and the vacuum in the helix terminating portion C becomes large, a large amount of the mixture is fed into the helical portion B via the bypass passage 14 when the flow control valve 18 opens. As mentioned above, when the engine is operating at a high speed under a heavy load, since the flow control valve 18 opens, the entire flow area of the intake port 6 is increased, and a large amount of the mixture is fed into the helical portion B via the bypass passage 14 having a low flow resistance. As a result of this, it is possible to obtain a high volumetric efficiency. In addition, by forming the inclined wall portion 9a, the flow direction of a part of the mixture introduced into the inlet passage portion A is deflected downward. As a result of this, since the part of the mixture flows into the helical portion B along the bottom wall of the intake port 6 without swirling, the flow resistance of the intake port 6 becomes small. This makes it possible to further increase volumetric efficiency when the engine is operating at a high speed under a heavy load.

Figure 10:
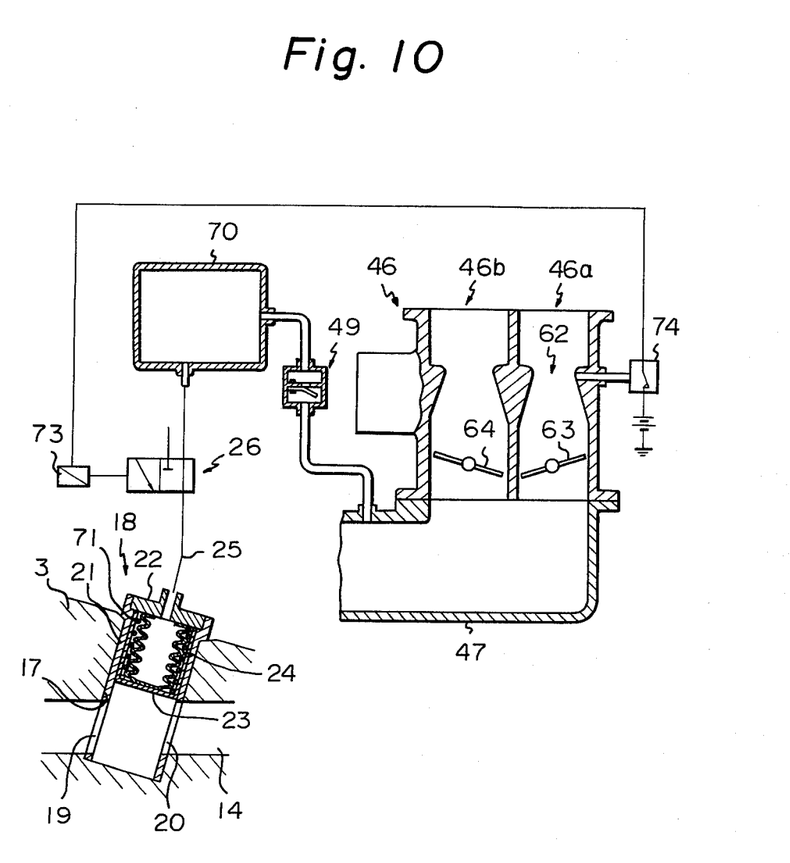
FIG. 10 is an entire view of an alternative embodiment of the flow control device.

FIG. 10 illustrates an alternative embodiment. In this embodiment, a vacuum accumulation tank 70 is provided. This vacuum accumulation tank 70 is connected to the interior of the intake manifold 47 via the check valve 49. Therefore, the level of vacuum in the vacuum accumulation tank 70 is maintained at the maximum vacuum which has been produced in the intake manifold 47. On the other hand, a compression spring 71 is inserted between the piston 23 and the lid 22. The piston 23 and the bellows 24 fixed onto the piston 23 are biased downward due to the spring force of the compression spring 71. The interior of the bellows 24 is selectively connected to the vacuum accumulation tank 70 or the atmosphere via the directional control valve 26, which is actuated by a solenoid 73. A vacuum switch 74, operated in response to a change in vacuum produced in the venturi portion 62 of the primary carburetor 46a, is mounted on the carburetor 46. The energizing operation of the solenoid 73 is controlled by the vacuum switch 74.

When the engine is operating under a heavy load at a high speed, that is, when the amount of air fed into the cylinder of the engine is large, the interior of the bellows 24 is connected to the vacuum accumulation tank 70 via the directional control valve 26. Consequently, at this time, since a great vacuum acts on the interior of the bellows 24, the piston 23 moves upward against the compression spring 71. Thus, the piston 23 opens the bypass passage 14. On the other hand, when the engine is operating under a light load at a low speed, that is, when the amount of air fed into the cylinder of the engine is small, the vacuum switch 74 is turned OFF. As a result of this, the solenoid 73 is deenergized, and the directional control valve 26 is operated so that the interior of the bellows 24 becomes open to the atmosphere. Consequently, at this time, the piston 23 moves downward due to the spring force of the compression spring 71 and shuts off the bypass passage 14.

According to the present invention, since the flow control valve has a small size and a simple construction, it is possible to improve the reliability of the flow control valve and the flow control valve can be easily assembled to the cylinder head even if the cylinder head has little space at the upper face thereof. In addition, the lubricating oil pump and intake manifold normally provided in a conventional engine can, in the present invention, be used as a power source for actuating the bellows. Consequently, in the present invention, there is an advantage that no other new power source is necessary for actuating the bellows. In addition, since the piston is completely retracted from the bypass passage when the engine is operating under a heavy load at a high speed, it is possible to reduce the flow resistance of the bypass passage when the flow control valve opens.

When the invention has been described with reference to specific embodiments chosen for purposes of illustration, it should be apparent that numerous modifications could be made thereto by those skilled in the art without departing from the spirit and scope of the invention.

We claim:

1. A device for controlling the flow in a helically-shaped intake port of a cylinder head of an internal combustion engine in order to increase the volumetric efficiency of the engine, said intake port comprising a helical portion around an intake valve, and a substantially straight inlet passage portion tangentially connected to the helical portion and having a helix terminating portion, said device comprising:

a bypass passage entirely within said cylinder head, said bypass passage having one end directly connected to the inlet passage portion and its other end opening into an upper end of the helix terminating portion of the helical portion such that the flow into the upper end of the helix terminating portion from the bypass portion is in a direction opposite to a swirl flow in the helix terminating portion;

a normally closed flow control valve transversely movable in said bypass passage for controlling the flow area of said bypass passage, said flow control valve having bellows therein and being actuated by said bellows; and actuating means for actuating said bellows in response to the change in the amount of air fed into the intake port to open said flow control valve when said amount of air is increased beyond a predetermined value, the opening of the valve reducing the swirl flow and thereby increasing volumetric efficiency.

2. A device according to claim 1, wherein said bypass passage has an outlet opening which is open to the helical portion at a position near a top wall of the helical portion.

3. A device according to claim 2, wherein the top wall of the helical portion has a steeply inclined wall portion at the helix terminating portion, the outlet opening of said bypass passage being arranged near said steeply inclined wall portion.

4. A device according to claim 1, wherein said flow control valve comprises a spring-loaded piston movable transversely in said bypass passage and actuated by said bellows.

5. A device according to claim 4, wherein said flow control valve comprises a stationary hollow sleeve extending through said bypass passage and having a pair of openings which are aligned with said bypass passage, said piston slidably inserted in said hollow sleeve and covering or uncovering said openings.

6. A device according to claim 4, wherein said piston has a cup shape, and said bellows is arranged in said piston.

7. A device according to claim 1, wherein the intake passage portion has an inlet open end located furthest from the helical portion, said bypass passage having an inlet opening which is open to the inlet passage portion at a position near said inlet open end.

8. A device according to claim 7, wherein the intake passage portion comprises an upper wall, a bottom wall, a first side wall located near the intake valve and a second side wall located remote from the intake valve, said first side wall comprising a downwardly inclined portion located near the helical portion, and a substantially vertical portion located near said inlet open end, the inlet opening of said bypass passage being formed on said vertical portion.

9. A device according to claim 8, wherein the intake port comprises a valve guide projecting into the helical portion from an upper wall of the helical portion and having a circumferential wall, said downwardly inclined portion being tangentially connected to the circumferential wall of said valve guide.

10. A device according to claim 1, wherein said actuating means comprises a vacuum source, an actuator operated in response to the change in the amount of air fed into the intake port, and a directional control valve actuated by said actuator for selectively connecting an interior of said bellows to said vacuum source or the atmosphere.

11. A device according to claim 10, wherein said vacuum source comprises a vacuum accumulation tank connected to the intake port via a check valve for maintaining the level of vacuum in said vacuum accumulation tank at the maximum vacuum which has been produced in the intake port.

12. A device according to claim 10, wherein said actuator comprises a switch operated in response to the change in the amount of air fed into the intake port, and a solenoid operated in response to an output signal of said switch and actuating said directional control valve.

13. A device according to claim 12, wherein the engine comprises a carburetor connected to the intake port and having a venturi portion, said switch being operated in response to a change in the level of vacuum produced in said venturi portion.

14. A device according to claim 1, wherein said actuating means comprises a pressure source, an actuator operated in response to the change in the amount of air fed into the intake port, and a directional control valve actuated by said actuator for selectively connecting an interior of said bellows to said power source or the atmosphere.

15. A device according to claim 14, wherein said pressure source is a lubricating oil pump.

16. A device according to claim 14, wherein said actuator comprises a vacuum chamber, a diaphragm connected to said directional control valve and actuated in response to a change in the level of the vacuum in said vacuum chamber, and a control apparatus maintaining the level of the vacuum in said vacuum chamber at the maximum vacuum which has been produced in the intake port when the amount of air fed into the intake port is smaller than said predetermined value and connecting said vacuum chamber to the atmosphere when said amount of air is larger than said predetermined value.

17. A device according to claim 16, wherein said control apparatus comprises a check valve arranged between the intake port and said vacuum chamber for allowing only the outflow of air from said vacuum chamber, and a control valve for controlling the fluid connection between said vacuum chamber and the atmosphere to connect said vacuum chamber to the atmosphere when said amount of air is larger than said predetermined value.

18. A device according to claim 17, wherein the engine comprises a carburetor connected to the intake port and having a venturi portion, said control valve being actuated in response to a change in the level of the vacuum produced in said venturi portion.

19. A device according to claim 18, wherein said control valve comprises a valve body for controlling the fluid connection between said vacuum chamber and the atmosphere, a vacuum cavity connected to said venturi portion, and a diaphragm connected to said valve body and actuated in response to a change in the level of the vacuum produced in said vacuum cavity.

* * * * *